United States Patent
Peterson et al.

(10) Patent No.: US 7,416,488 B2
(45) Date of Patent: Aug. 26, 2008

(54) SYSTEM AND METHOD FOR PLAYING A GAME OF SKILL

(75) Inventors: Randall S. E. Peterson, Garibaldi Highlands (CA); Stephen Matthew White, Port Coquitlam (CA); Mitch White, Vancouver (CA); Tryon Miles Williams, London (GB)

(73) Assignee: Duplicate (2007) Inc., New York, NY (US)

( * ) Notice: Subject to any disclaimer, the term of this patent is extended or adjusted under 35 U.S.C. 154(b) by 559 days.

(21) Appl. No.: 10/197,569

(22) Filed: Jul. 18, 2002

(65) Prior Publication Data

US 2003/0027639 A1      Feb. 6, 2003

Related U.S. Application Data

(60) Provisional application No. 60/305,909, filed on Jul. 18, 2001.

(51) Int. Cl.
*A63F 9/24* (2006.01)
*A63F 9/18* (2006.01)
*G06F 17/00* (2006.01)

(52) U.S. Cl. ............... 463/42; 463/9; 463/29; 463/40; 463/43; 273/431

(58) Field of Classification Search ............... None
See application file for complete search history.

(56) References Cited

U.S. PATENT DOCUMENTS

| | | | | |
|---|---|---|---|---|
| 4,592,546 A | * | 6/1986 | Fascenda et al. | 463/29 |
| 4,636,951 A | * | 1/1987 | Harlick | 463/25 |
| 5,120,076 A | * | 6/1992 | Luxenberg et al. | 463/42 |
| 5,351,970 A | * | 10/1994 | Fioretti | 463/19 |
| 5,586,257 A | * | 12/1996 | Perlman | 463/42 |
| 5,586,937 A | * | 12/1996 | Menashe | 463/41 |
| 5,669,817 A | | 9/1997 | Tarantino | |
| 5,779,549 A | * | 7/1998 | Walker et al. | 463/42 |
| 5,857,911 A | | 1/1999 | Fioretti | |
| 5,879,233 A | | 3/1999 | Stupero | |
| 5,894,556 A | * | 4/1999 | Grimm et al. | 709/227 |
| 5,935,002 A | | 8/1999 | Falciglia | |
| 6,012,984 A | | 1/2000 | Roseman | |
| 6,117,011 A | * | 9/2000 | Lvov | 463/25 |
| 6,171,186 B1 | * | 1/2001 | Kurosawa et al. | 463/31 |
| 6,174,237 B1 | * | 1/2001 | Stephenson | 463/42 |
| 6,264,560 B1 | * | 7/2001 | Goldberg et al. | 463/42 |
| 6,299,452 B1 | * | 10/2001 | Wasowicz et al. | 434/178 |
| 6,475,089 B1 | * | 11/2002 | Lee | 463/40 |
| 6,569,012 B2 | * | 5/2003 | Lydon et al. | 463/9 |
| 6,604,997 B2 | * | 8/2003 | Saidakovsky et al. | 463/9 |
| 6,722,888 B1 | * | 4/2004 | Macri et al. | 434/247 |
| 2001/0031660 A1 | * | 10/2001 | Wilk et al. | 463/19 |
| 2003/0060286 A1 | * | 3/2003 | Walker et al. | 463/42 |
| 2003/0168805 A1 | | 9/2003 | Samberg | |

* cited by examiner

*Primary Examiner*—Robert E Pezzuto
*Assistant Examiner*—Sunit Pandya
(74) *Attorney, Agent, or Firm*—Ked & Associates LLP

(57) ABSTRACT

The present invention is directed to a method and apparatus for playing a game of skill in a networked environment. A host server transmits a game data packet to each participant after receiving a request from the participant. Upon initiation of game play, the participants are shown identical game messages so that each participant is playing the same game. After a participant believes they have won the game, a message is sent to the server. The server then evaluates the performance of all the participants and determines a skill level for each participant.

14 Claims, 9 Drawing Sheets

SYSTEM AND METHOD FOR PLAYING A GAME OF SKILL

This application claims priority from U.S. Provisional Patent Application No. 60/305,909 filed Jul.18, 2001.

BACKGROUND OF THE INVENTION

1. Field of the Invention

The invention relates to the field of skill games, more particularly, to an interactive system and method for enabling a bingo-like game to be played in a multi-user environment.

2. Description of the Prior Art

In the game of traditional bingo and similar games of chance the basic elements include a gaming board and a random number-generating device. The game of Bingo, also known as lotto, has been a popular game to play for people of all ages. Traditional Bingo is essentially a lottery where multiple players purchase unique bingo cards comprised of an array of symbols arranged in a particular pre-set pattern. The most common gaming board is a 5 by 5 numerical array, with the centremost location being a blank or "free-space". The game is generally played using between 75 and 90 numbers though it is not limited to these values. On a 5 by 5 gaming board, each column of the array is limited to approximately one-fifth of the numbers, for example a first column contains numbers ranging from 1-15 in the event that 75 numbers are used, and 1-18 when 90 numbers are used. In a second column numbers are selected from the group 16-30 or 19-31 respectively. No duplicate numbers appear on the gaming board.

When the traditional game of Bingo is played, a specific pattern or shape is formed on the gaming board by application of the symbols. When a symbol is called or revealed to a player which coincides with a symbol found on the gaming board, the player marks the symbol on the board to identify it having been called. A series of randomly selected symbols are called until a first player has a set of randomly called symbols coincide with the symbols on the gaming board in the desired pattern or shape specified. A winner is determined by comparison and verification of the series of randomly selected symbols called during game play and those marked on the board to form the specified pattern. Examples of common patterns or shapes that may be used are "X", "L", "T", a line, and the like.

The greater the number of cards the player plays in the game, the greater the chance of winning, in the sense that buying more individual lottery tickets in a field of lottery tickets gives one a greater chance of winning the random draw. The game of Bingo and similar chance games have long been played at churches, in schools, at halls, at resorts, and many other centralized facilities to raise money for charity and for profit where gambling is legal. Typically, people pay to play bingo and similar games of chance primarily to win money. In addition, games of chance have been used by churches, schools, and other centralized facilities as a means to raise money for charity or, profit the sponsoring institution. However, in order to run such charity events, gambling licenses must generally be obtained.

Every Bingo game and similar game of chance has a winning card, such that a player's chance of winning is random and depends upon the number of cards in the game and how many cards they are playing. For example, if a player has 14 cards in a game with 1400 cards the chances of winning for that player is 1 in 100. Chance games are based on statistical odds and are primarily independent of player skill unlike the game of Poker which involves a combination of both chance, on the cards received, and skill on the play of the cards.

In the conventional Bingo parlor, a caller could reveal random numbers to the players, and a plurality of players would mark the game board according to the random numbers drawn from the total numbers available. The caller may be a person drawing from a bin containing all the possible symbols or may be a computerized system which flashes the symbols on an overhead screen. When a player has a BINGO (i.e. 5 in a row, column, diagonal or the requisite game pattern(s)), the player would call out BINGO or any other phrase indicating completion of the requisite pattern. The game pauses while the pattern of the game board is verified by comparing the numbers called against the numbers marked on the game board. Each game proceeds until a player wins (there is always a winner). It is the responsibility of each player to keep up-to-date with the random numbers called and to identify a winning game board.

Today's technology allows for games of all types to be played over computer networks, for example the Internet. Generally online games, such as video games, are available over the Internet. The games may require players to download large files of executable code designed to run on a particular platform. The alternative is to have players access a server site over the Internet, where the server is running software and the players act as a game client. The game client uses a connection to the Internet to interact with the server. The server typically manages a plurality of game clients thus allowing competition in that game to occur between multiple game clients at locations worldwide on that particular server. Online versions of conventional bingo and other games of chance are generally the same. These games have a random number generator and a random number selector. A virtual game board replaces the printed-paper game board. Conventional bingo is a gambling game and is a game of chance. The majority of Internet based chance games are played for fun or for sweepstakes prizes because of jurisdictional restrictions placed on gambling. Online games of chance are most commonly not available for play with any significant monetary remuneration. In addition, bingo parlors generally operate with jurisdictional authorization again because of restrictions place on gambling.

There are a number of prior proposals for implementing a bingo like game on a network. U.S. Pat. No. 5,857,911 teaches a method and apparatus for playing bingo over a wide area network. The system is interactive and contemplates user input while the game is ongoing. U.S. Pat. No. 5,935,002 teaches a computer-based system and method for playing a bingo-like game to facilitate multi-user play and strategic interaction with the game itself. U.S. Pat. No. 6,012,984 discloses a system for providing large arena games played in real time over a computer network. A server collects information from a game client to determine the moves being played by that game client. This information is collected on a per move basis.

Games of chance typically contain the three basic elements that, for most jurisdictions, distinguish it as a gambling game. These are chance, consideration and reward. However, these games involving an element of chance are typically played where gambling is legal and typically require the host to obtain specific permits and meet particular regulations. The need for permits when hosting games of chance prevents the play of bingo like games on-line for redemption of valuable prizes.

The need for gambling licenses and the like is generally restricted to games of chance. On the other hand, a skilled game involves no chance aspects and relies upon the skills a player possesses to predict the outcome of the game. Such games may generally be operated without licenses and the like.

It is an object of the present invention to eliminate the element of chance from a traditional game of chance so as to create a skill dependent game.

SUMMARY OF THE INVENTION

Accordingly, there is provided a gaming system relating to a skilled board game for play in a multi-user environment having no element of chance. In a skill game, each player in the multi-user environment has an equal chance of winning, as game play is dependent on skills of individual player.

A first embodiment of the present invention is directed toward a system comprising at least a pair of game clients, at least one server, a data store linked to the server, a client application including a library located at each game client and a mechanism to transmit data between a game client and server. The data store further includes information pertaining to game client membership data, settings and options (e.g. encryption level), and authentication information. In addition, the system has a means for verification of game client credentials. The server communicates with the game client such that the game client receives a game data packet of game information to facilitate game play. On completion of a game the game client returns the game data packet to the server and on analysis of the data packet, the server communicates to the game client the game results.

The game host may be located on the game client or may be a server facilitating the game. Game play generally involves the matching of a plurality of symbols revealed to the player to symbols found on a game board such that a specific pattern or shape is formed on a gaming board by application of the symbols. Each game client plays the identical game board(s) and is revealed the identical symbols in the identical order for matching with those found on the game board. As each game client plays the identical game, the basis for winning the game is time dependent. Skills such as: hand-eye coordination, reaction time, dexterity, spatial memory, long-term memory, etc. predominate the play of the game and allow a more skilled player to complete the matching of symbols revealed with those on the game board in a shorter time period. Further, the system is such that a skilled player will predictably win over the unskilled player.

The level of difficulty of game play is variable and may be selected by a player wishing to play at a particular level. The level of difficulty may be varied for example by the number of game boards to be played, the speed at which the symbols are revealed, the number and type of game board patterns required to win, the addition of skill testing questions etc. In the preferred embodiment, the system further includes a ranking mechanism such that skilled players may be required compete at a particular level of difficulty. Each level of difficulty requires a player to achieve a higher skill level. This high skill level is commensurate for example with a player playing multiple game boards. Where an unskilled player may efficiently handle five game boards, a skilled player is expected to handle ten game boards. The ranking mechanism is such that a skilled player is restricted to play at a particular level of difficulty.

To begin game play, a connection between a game client and a server is formed such that the game client communicates with the server via the transmission mechanism. Preferably, the game client facilitates a secure connection, typically using SSL for encrypted communication. The player inputs membership information (name, address, etc.) into the game and the game client transmits same to the server for authentication. Once logged on, the player selects a game for play and in the preferred embodiment, the desired level of difficulty. On commencement of a game, the server sends a game data packet to the client application of a game client. In the preferred embodiment the game data packet includes at least one game board, the symbols to be revealed, the speed at which symbols are revealed, required game board pattern and other game skill set variables. Each of the symbols to be revealed is previously selected by the server such that each game data packet for a specific game contains the identical symbols. In this manner, each player receives an identical game data packet. The player opens the data packet and the information contained therein is displayed to the player and the game commences. The client application of the game client displays the symbols to the player at a pre-set speed (originally set by the server) and preferably records player input data thus recording game play. Once the player achieves the required game board pattern and indicates the game is complete, the client application records the time taken to play the game from start to finish and sends that information to the server. On judging a winner, both accuracy and time are key variables.

On opening a game data packet, a player initiates game play, which prompts the start of a timing mechanism. During game play, the player matches symbols revealed to those on the game board. The player is aware of the pattern they must obtain in order to complete the game. Once the player has marked a particular number of symbols revealed and has achieved the required game pattern, the player stops game play which prompts the timing mechanism to record the time from the start to finish of game play.

In another embodiment, the system further includes a payment mechanism such that players pay a fee for game play. Preferably credit information of a player or game client is sent to a payment gateway for configuration of an account and verification. On approval, the payment gateway sends game client information to the server such that the game client is registered for a particular game and the game client receives a data packet from the server. The game client on completing game play, indicates the completion of a game to the server and, in turn, information is sent to the payment gateway to update an account balance for that game client.

In one aspect of the present invention, there is provided a method of hosting a game of skill for participants located at a plurality of game clients, comprising the steps of transmitting a game data packet, corresponding to the game of skill to each of the plurality of game clients; initiating the game of skill; transmitting identical game messages at predetermined time intervals to each of the plurality of game clients; sensing end of the game of skill; receiving end of game data packets from each of the plurality of game clients; and evaluating the end of game data packets to determine a post-game skill level of each of the participants located at the plurality of game clients.

In yet another aspect of the present invention, there is provided Apparatus for playing a game of skill comprising a server for hosting the game of skill; a data store, linked to the server, for storing game data packets corresponding to the game of skill; a plurality of game clients connected, via a network, to the server; for requesting and receiving a game data packet from the server; each game client including a processor for executing the game data packet, communicating with the server during game play and for updating the game data packet during the game; wherein while the game of skill is being played, the server transmits identical messages to each of the plurality of game clients; and wherein when the game is finished, each of the plurality of game clients transmits the updated game data packet to the server for evaluation to determine skill level of each of the game clients.

In yet a further aspect of the invention, there is provided a method of providing a game of skill in a multi-participant environment comprising the steps of sensing requests from each participant for a game data packet corresponding to the selected game of skill; transmitting an identical game data packet to each of the participants to enable each of the participants to compete in the game; receiving an end of game message from one of the participants; receiving updated game data packets from each of the participants corresponding to the completed game; evaluating each of the game data packets to determine skill level of each of the participants; and communicating the skill level to each participant.

In another aspect, there is provided a method of playing of a game of skill comprising the steps of receiving a game data packet from a server; executing the game data packet to commence playing the game of skill; updating the game data packet during game play corresponding to moves by the participant; signalling completion of the game of skill to the server; and transmitting the updated game data packet to the server for evaluating skill level of the participant.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
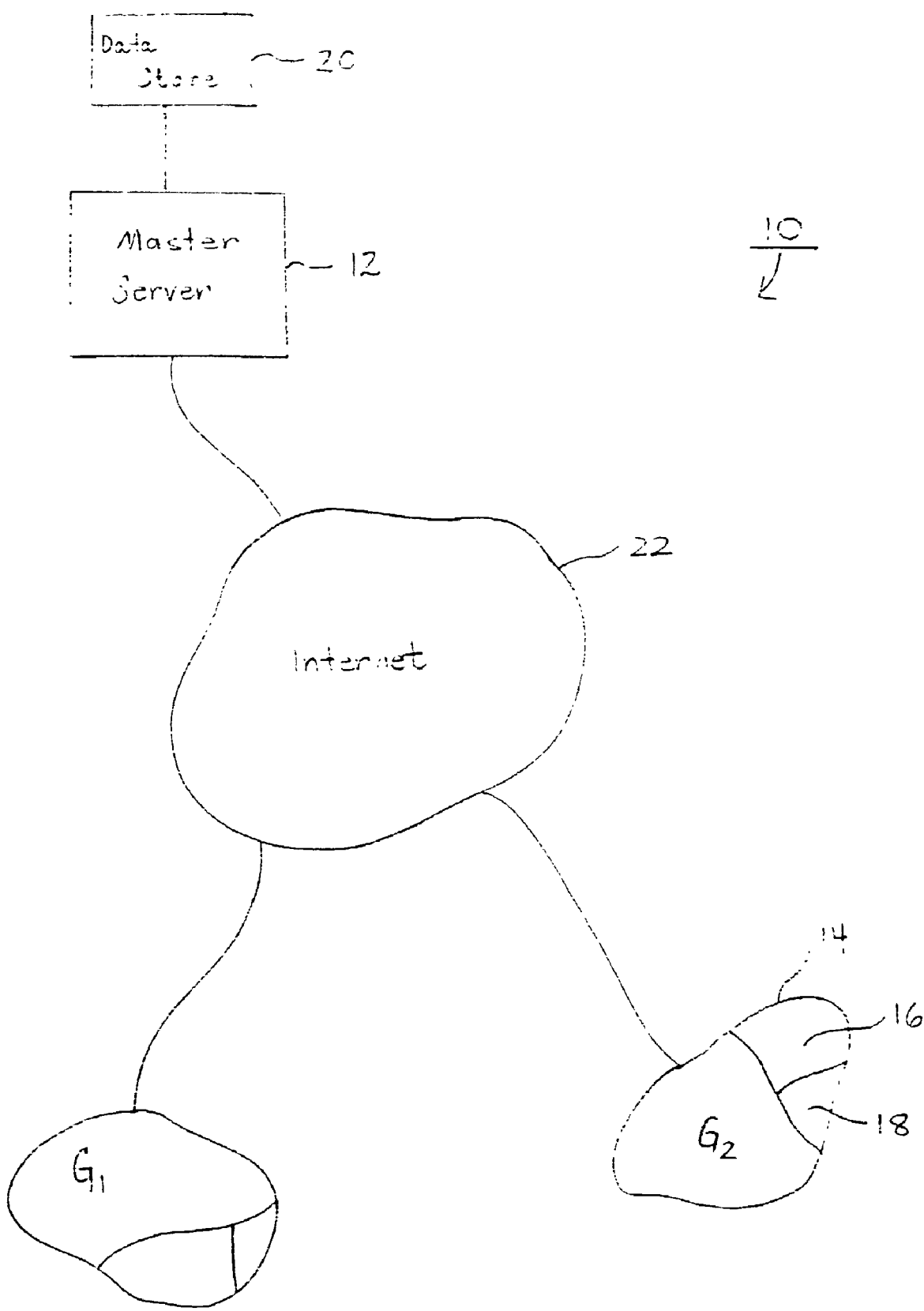
FIG. 1 is a schematic diagram of an overview of a computer system.

A system and method for playing a game of skill is illustrated in FIGS. 1 through 9 and is generally designated by reference numeral 10.

As shown in FIG. 1, a system 10 for play of a skill game comprises a pair of game clients 14, one or more servers, one which acts as a master server 12 and a data store linked to the server 20, whose contents may be updated and changed periodically by external intervention. In this embodiment, the game client 14 communicates with master server 12, where master server 12 acts as a game host as will be detailed below.

Figure 2:
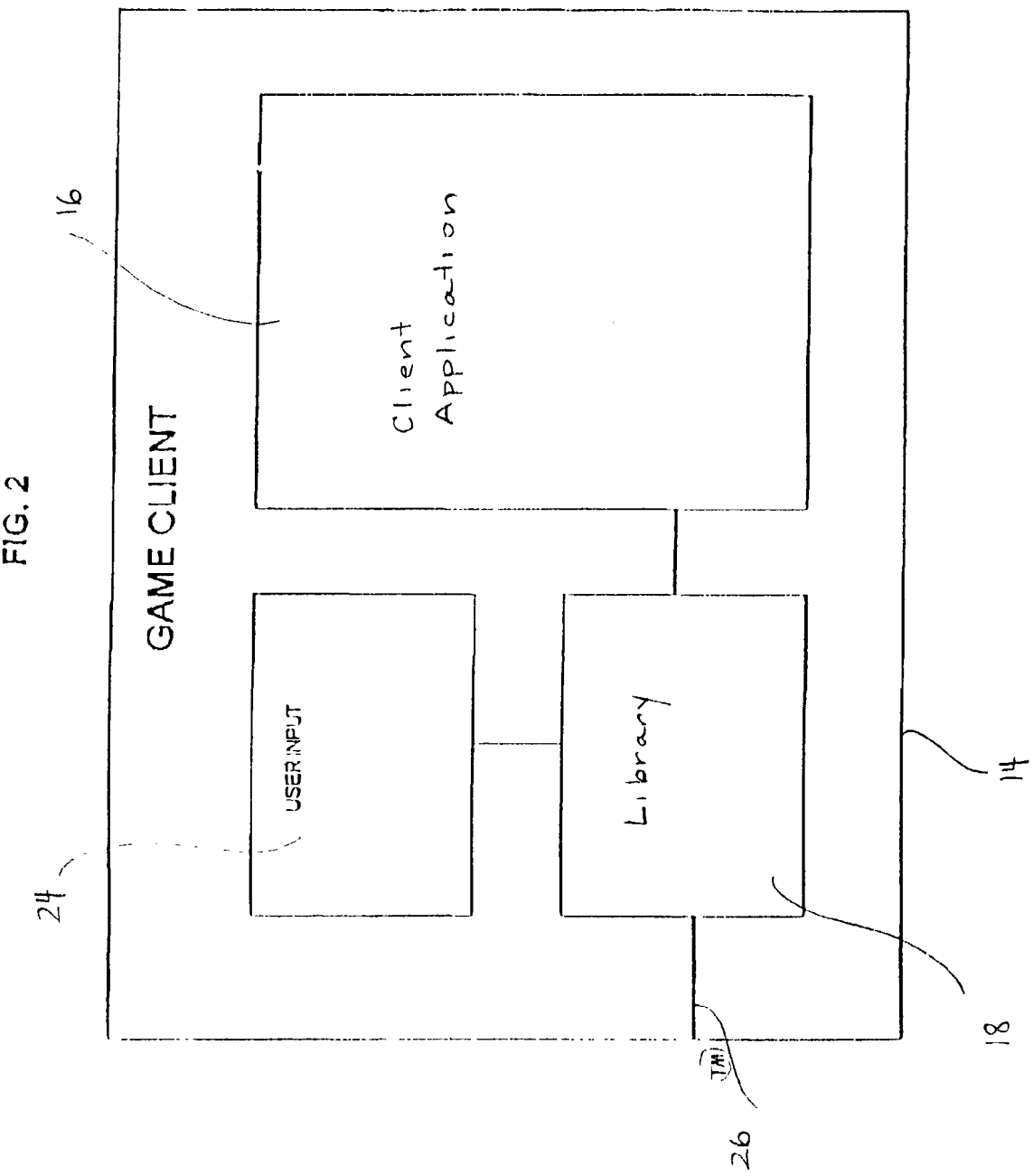
FIG. 2 is a schematic diagram of the game client of the computer system in FIG. 1.

A game client 14, an example of which is illustrated schematically in FIG. 2, consists of a client application 16 which includes proprietary software that displays game information and facilitates game play. The client application 16 and related library 18 allow the game client to both send and receive data to and from the master server 12 through a transmission mechanism 26. This transmission mechanism 26 utilizes any existing communication hardware known to one skilled in the art. The game client 16 further includes an input device 24, for example a keyboard or mouse, to direct the functioning of the game client 14. Although the typical input device 24 specified is a keyboard or mouse, the present invention is not limited to those types of input devices. In the preferred embodiment, the game client 14 includes a timing mechanism such that the client application 16 calculates the time taken for the game play from start to finish. This information is sent to the server 12 along with any other user-input data for the judging purposes.

The library 18 located at each game client 14 receives data packets and collects data packets to be sent to server 12 by way of the transmission mechanism 26. The library 18 communicates with the client application 16 through an application program interface (API), where the API is responsible for transmitting information to and receiving information from the client application 16 and related library 18 and the server 12. The server 12 tracks, in the preferred embodiment, changes made to the data store 20 and subsequently updates each library 18 located at each game client 14 with any modifications to the proprietary software component of the client application 16.

The system 10 enables the establishment of a secure communication between a game client 14 and server 12 over a public network such as the Internet 22. The game client facilitates encrypted communication preferably through the use of SSL. In establishing a connection between the game client 14 and game server 12, information may be sent between the two via the transmission mechanism 26.

In the preferred embodiment, a game client 14 is either preferably a computing device such as a personal compute, personal digital assistant (PDA) or even a cell phone with browser capability. The transmission mechanism 26 of the game client 14 includes any communication means known in the art, for example, networking cards, wireless communication devices, communication lines, etc. The transmission mechanism 26 preferably operates using secure TCP/IP or UDP protocols but is not limited to such protocols.

Figure 3:
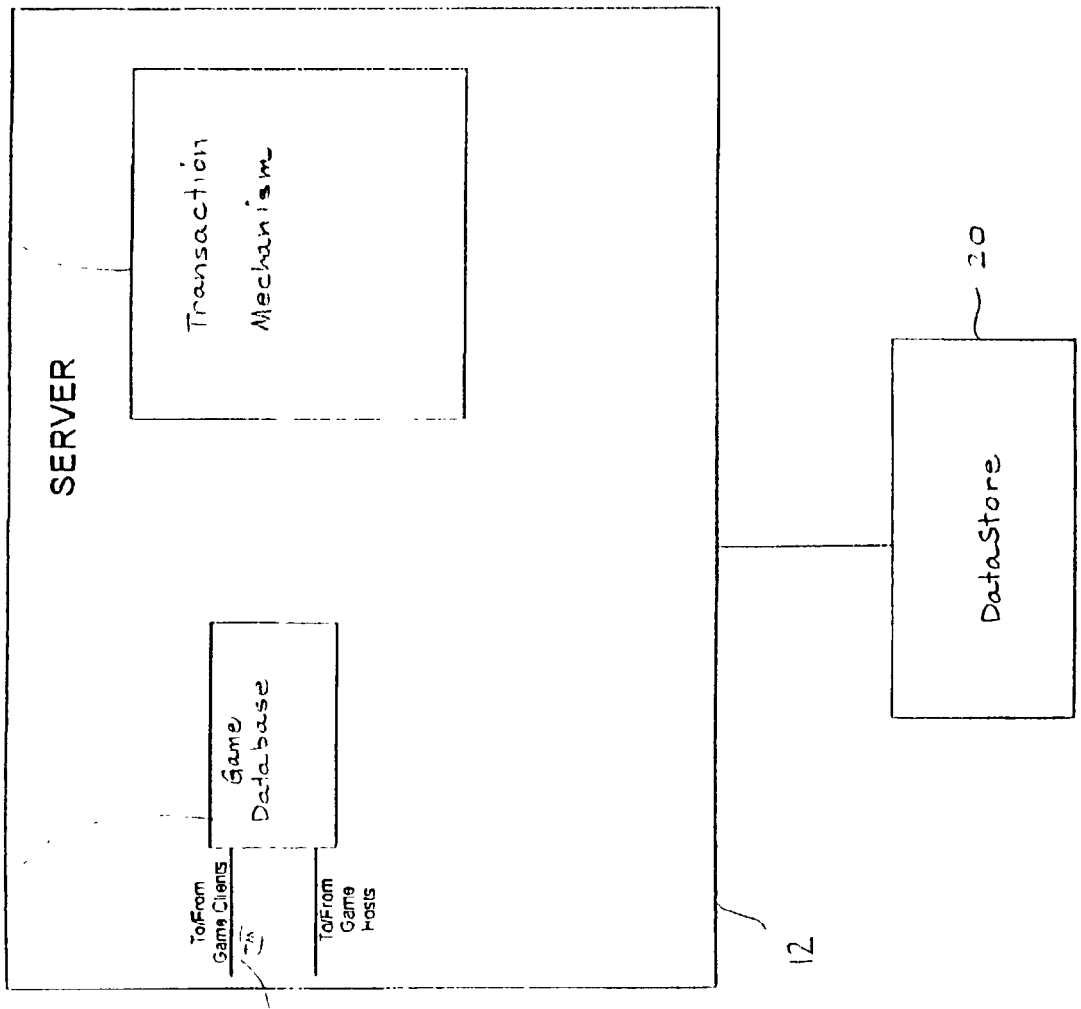
FIG. 3 is a schematic diagram of the server of the computer system shown in FIG. 1.

The master server 12, an example of which is illustrated schematically in FIG. 3, includes a transaction mechanism 28 for collecting information on currently operating game clients and receives requests from game clients for this information. The server 12 maintains a list of active game clients 14 and other active servers (15, 27 shown in FIG. 4); and adding or removing game clients 14 from the list as the status of game clients 14 change. The server 12 may further include a game database 30 which includes a list of games available for play, tournaments for entry, and the like. The linked datastore 20 includes game client membership data, updates to the proprietary software as well as information pertaining to levels of data encryption.

Figure 4:
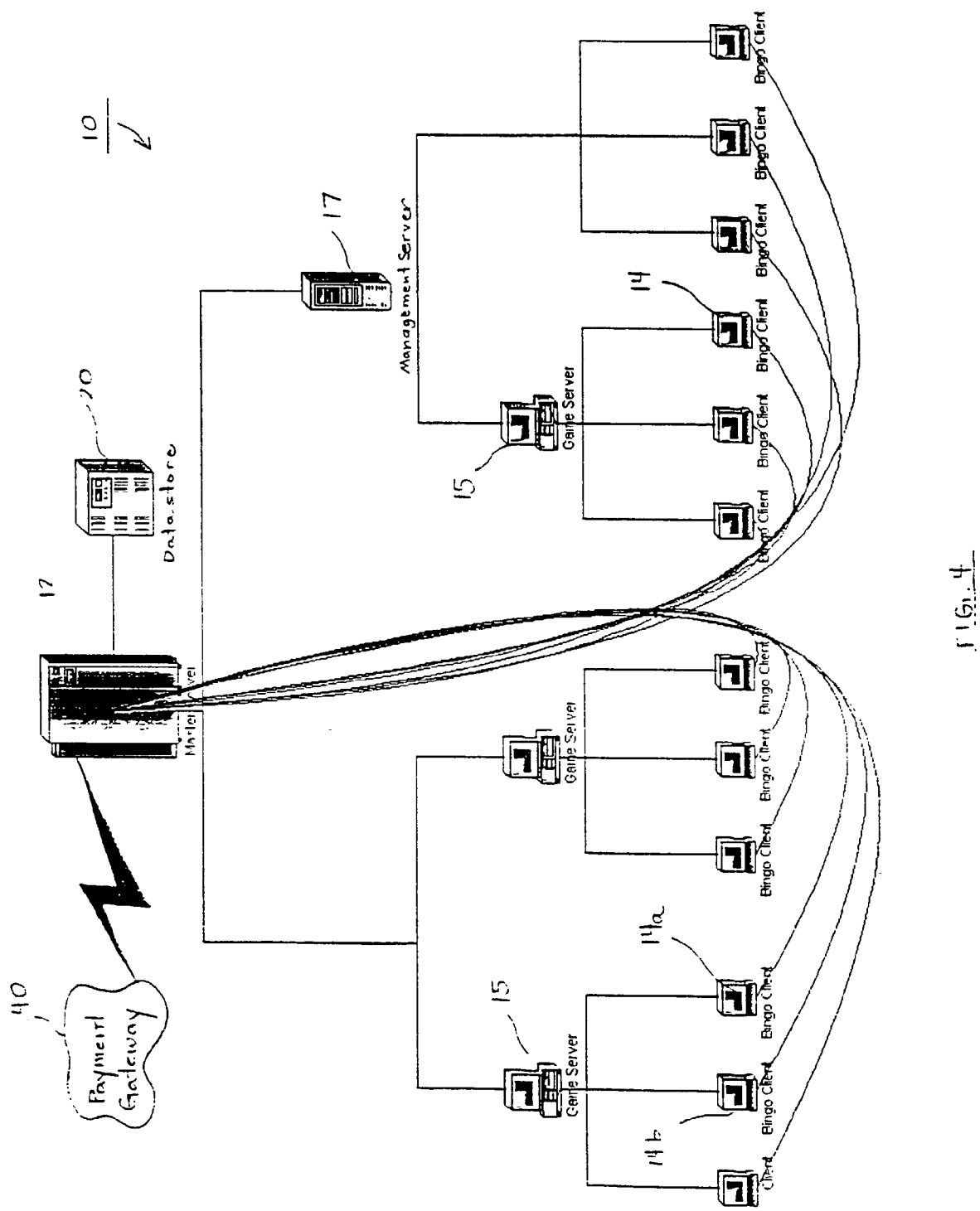
FIG. 4 is a schematic diagram of the preferred embodiment of the computer system of FIG. 1.

In another embodiment, the system 10 further includes at least one game server 15 as shown in FIG. 4 interposed between the game client 14 and master server 12. In this embodiment, the game client 14 communicates with the master server 12 through game server 15. The game server 15 accesses the credentials of a game client 14 so as to either authorize or deny access to a particular game, on the basis of financial data or skill level. The game server 15 acts as the game host and, as such, generates the game boards and the symbols to be revealed to the game clients 14 for packaging in a game data packet. In the preferred embodiment, the game server 15 includes a random number generator for the selection and compilation of the symbols to be revealed. However, in the alternative, the symbols to be revealed may be preselected by the game server 15 itself such that the exact moment of pattern completion is knowingly selected as opposed to randomly generated. This allows game clients 14 to experience a number of near misses during game play in the sense that many patterns are almost complete but are missing at least one matched symbol. Systematically selecting the series of symbols to be revealed allows the players to have numerous patterns near completion and typically heightens the excitement of game play.

Figure 8A:
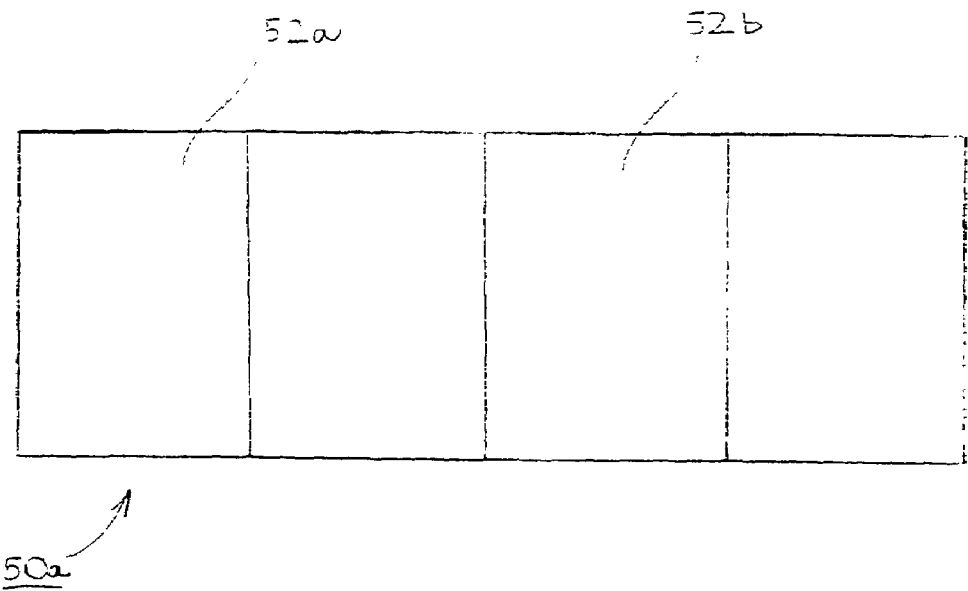
FIG. 8 is a schematic diagram of the data packet of the computer system in FIG. 1.
Figure 8B:
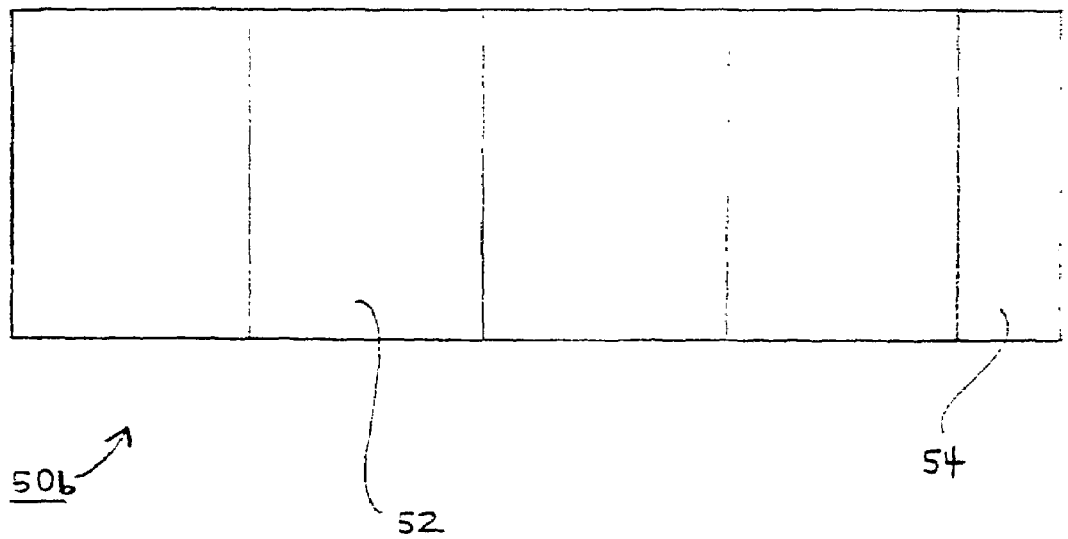

The game server 15 determines each of the symbols to be revealed, the order and speed of revelation, and the game board pattern to be achieved. Each game data packet 50, shown in FIG. 8, for each individual game is identical such that players of a particular game each receive identical game data packets 50. On selecting a game, the game server 15 compiles the game data packets 50a for sending to the participating game clients 14. Each of the game servers 15, in the preferred embodiment set parameters of play such as the particular pattern to be achieved on a game board, the speed at which symbols are revealed, and the like. In addition, the game data packet 50 generated by the game server 15 may further include a challenge question specific to the game client 14. On completion of a particular game, the game client 14 will return an answer to the challenge question as well as append timing data. The game server 15 will then compare the challenge question and challenge answer to ensure that there has been no tampering on communication between the game client 14 and game server 15. Further, on receiving completed data game packets 50b (as shown in FIG. 8b) from game client 14, the game server 15 determines the winner on the basis of the user input data, game play timing and other information sent by the game client 14. In turn, the game server 15 communicates with the game client 14 the results of each game.

In the preferred embodiment the timing mechanism records an accurate reading of the passage of time during the game play through use of the computer hardware of a game client 14. Computing devices contain a hardware component responsible for the maintenance of the current date and time. The hardware retains an accurate recording of the time and date even in the event that the computing device is switched off. The proprietary software component of the client application 16 records the elapsed time from the start of game play by continuously reading the time from the game client hardware. Preferably, the game client 14 records the elapsed time to a granularity of at least milliseconds. The game client 14 reads the time at a frequency of at least every 500 milliseconds. Further, the game client 14 preferably compares the most recently recorded time with the most recent previous recorded time to ensure against tampering. The ability to set the time stored within the system hardware is typically limited to the hundredth of a second. Therefore a user cannot change the time within the millisecond granularity of the polling of the system hardware for time data. In the event that a user attempts to change the recorded system time, the system would have to make a change of at least one hundredth of a second. Since this would be larger than the 500 millisecond polling period this change would be noted by the client application 16. When the most recently recorded time is compared with the most recent previous recorded time it should show an increase of 500 milliseconds, with a possible maximum variance of +/−5 milliseconds to account for power variances or extreme system load. If the newly recorded time does not fall within this range, then the recording of time during the duration of the game play cannot be relied upon, and has most probably been modified by the user and indicates unfair play.

The opening of a game data packet triggers a timing mechanism such that on opening, game play begins. The timing mechanism may be any device known to one skilled in the art for the accurate tracking of time. The player, on opening the game data packet sent to the game client 14, is presented with at least one game board. Symbols are revealed to the player by the client application 16 according to the parameters detailed in the game data packet. These parameters are present by the server or game host. In the preferred embodiment, the client application 16 throughout game play tracks the order in which the player marks symbols on a game board and the time at which each symbol is marked on the game board. On completion of the required pattern on the game board, the player indicates to the game client the end of the game such that the time of game completion is recorded by the timing mechanism. Indication may be by clicking a "stop" button or any means known to one skilled in the art. The game client sends the completed game packet with the appended timing data to the server. The server opens each completed data packet and authenticates the enclosed game play data. Authentication involves at least a comparison of the symbols revealed with the symbols marked on the game board to ensure the accuracy of play. In order to win the game, the player must complete the required pattern on the game board and the player must have marked a specific set of symbols. Those symbols marked must correspond to the symbols revealed during game play.

A further means for authentication involves a comparison of elapsed time. The server compares the speed at which the symbols are revealed to the time at which a player marked a particular symbol on the game board. Since the order of symbol revelation is pre-determined prior to game play, the server may determine at what time a particular symbol was revealed. For example, if the speed at which symbols are revealed is one every ten seconds, the fourth symbol is revealed at 40 seconds from the start of game play. Thus, if the fourth symbol revealed was marked on the game board at a time less than 40 seconds from the start of game play, this indicates unfair play. In addition, if 15 symbols are required to complete the required pattern and the specific 15 symbols of the pattern are revealed after the revelation of 20 symbols, then the fastest possible time for game play is 20 symbols×10 seconds/symbol=200 seconds. If a player completes the required game pattern in less than 200 seconds, this again indicates unfair play. In order to win a game, the player must record the fastest time for game play and must accurately mark the game card as described above.

An example of the above-mentioned means for authentication involves the use of timestamps. Each marking on a game board made by a player is recorded and stamped with a timestamp. Preferably this timestamp has a granularity to the millisecond. The clicking of the stop button is also given a similar timestamp. When a player completes game play and returns the data packet 52b (shown in FIG. 8b) to the server, the server analyzes the data packet to determine the authenticity of game play. The server first verifies that the required pattern has been marked correctly. The server then searches, in the reverse order from the revelation, for the symbols in the pattern marked on the game board with an array of the chronologically ordered symbols that were revealed. This allows the server to determine the last symbol revealed that completed the required pattern. Once the last symbol to complete the pattern is known, the server performs a calculation within the index of the array. Multiplying the index of the last required symbol revealed with the frequency at which the symbols are revealed yields the minimum amount of time in which a player could possibly complete the required pattern on the game board. Further, authentication of the timestamps attached to the marking of each symbol are analyzed by the system to identify recognizable patterns generated by cheat applications. For example, a player may build a program that upon a new symbol being revealed, scans the players game boards, and marks the ones it recognizes as matching the revealed symbol. Such a program would generally press the stop button when the pattern has been completed. In this instance, the program would scan the game boards displayed to the player, from one side of the display to the other, so as to identify a symbol and mark it. Such a program would mark the symbols in the location nearest the side on which the scan begins the fastest, and the time taken to mark the symbols a distance from the start of the scan increases. The time difference between the marking of a symbol on one game board and the same number on another game board would be directly proportional to the distance the two symbols are placed from one another. In most instances where a program such as the one described above is used for game play, the time taken from marking the last symbol in a pattern to hitting the stop button would be unachievable by a human. The system by recognizing these patterns may identify and ban players who attempt to cheat.

The system 10 may further include a management server 17. The management server 17 is preferably the host of a particular website which a game client 14 communicates with and logs onto in order to facilitate game play. The management server 17 communicates with the game client 14 either directly or through a game server 15. In this embodiment, the management server 17 is responsible for the authentication of game client 14 identity. The management server 17 has the ability to authorize or deny access of a game client 14 to a particular game. In addition, the management server 17 facilitates the organization of game tournaments. The management server 17 may further include a membership database for the collection of game client fees associated with play of a particular game. On organization of a tournament the management server 17 sets particular tournament conditions (such as the number of players required, minimum level of skill). Once these tournament conditions have been met, the management server 17 allocates a particular game server 15 to host a game or in the alternative, itself may serve as the game host. On selection of a game server 15 to function as the game host, the management server 17 passes the game clients 14 who have selected to play in a particular tournament to communicate with the game server 15 for game play.

On selection of a game by a game client 14, the game host (one of master server 12, game server 15 and management server 17) evaluates the skill level associated with the game client 14. Skill level is a ranking mechanism such that a skilled player is restricted to play at a particular minimum level of difficulty. The game host compares the skill level of the game client 14 to the skill level specified in the game selected. The game host will allow the game play, allow game play but apply a handicap, or deny game play. The 'handicap' allows for facilitating an even playing field play between an unskilled player versus a skilled player. The skilled player is essentially required to play at a higher level of difficulty than the unskilled player to facilitate a fair competition between the two players such that both players have an equal chance of winning. Examples of a handicap are playing of additional game boards, an increased speed for revealing the symbols, constant shuffling and rearrangement of game boards etc. In the preferred embodiment, skilled players are required to play at a particular level of difficulty such that an unskilled player plays against those of a like skill set. However, in an open tournament with no associated skill level, any player may enter.

In an alternative embodiment, the server (or game host) may reveal the symbols to the game client. However, because of latency issues inherent to communication over a public network, game play may be slow. Further, latency also inhibits fairness and equality of play in the case of a game client having a poor network connection.

The management server 17 may further include a statistical database (not shown) having a statistics monitor for receiving game play information regarding the outcome of various games and tournaments of skill. The statistics monitor records this information in a statistics database for purposes of accounting. In the preferred embodiment each management server 17 will uphold tournament configuration software from one of a file, user input or other alternate method. On creation of a tournament, the management server 17 notifies the master server 12 of the tournament and on the start of tournament play. Preferably, tournament results are submitted to the master server for recordation purposes.

Figure 5:
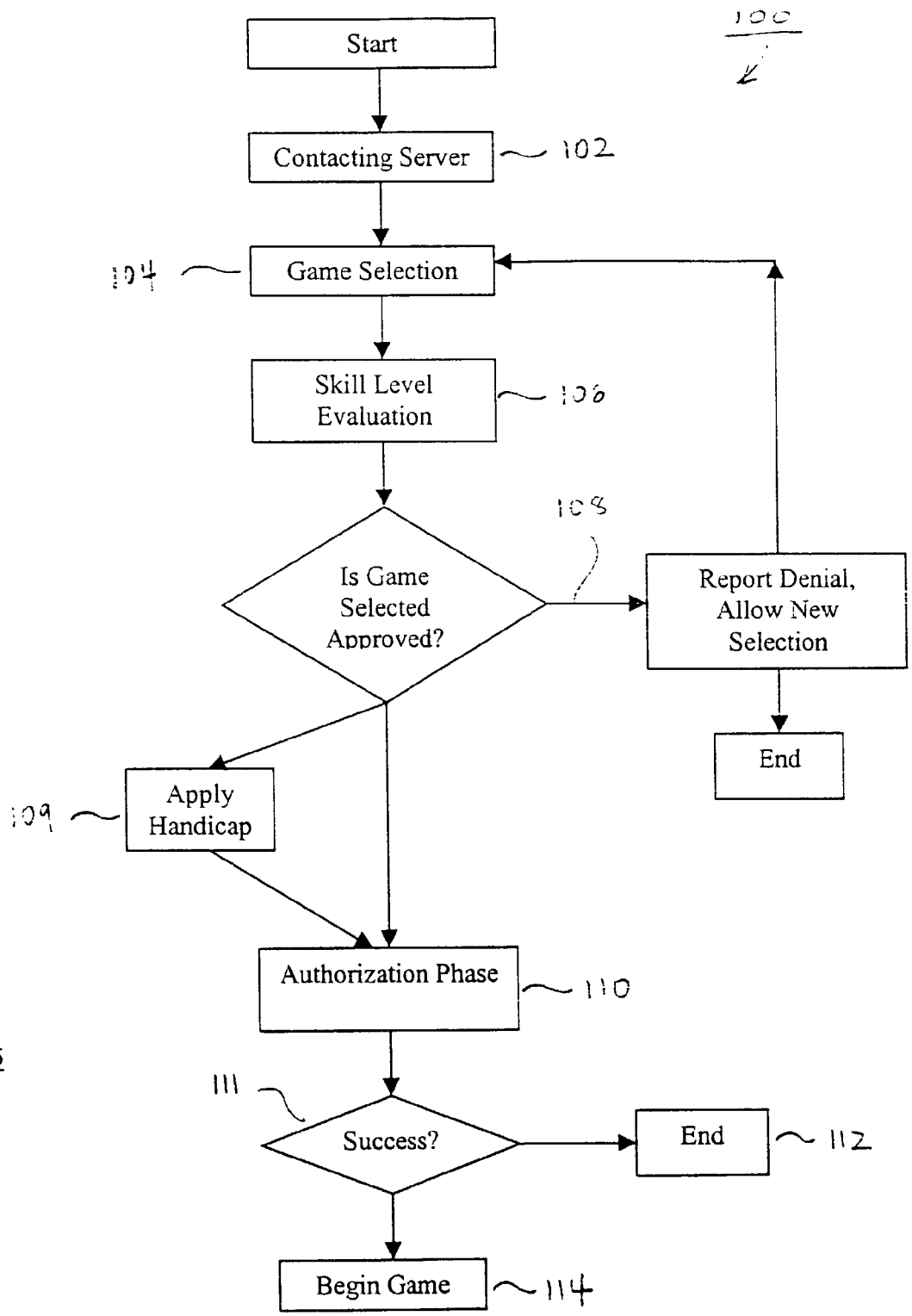
FIG. 5 is a functional block diagram detailing the method for establishing communication between a game client and server in the computer system of FIG. 1.
Figure 6:
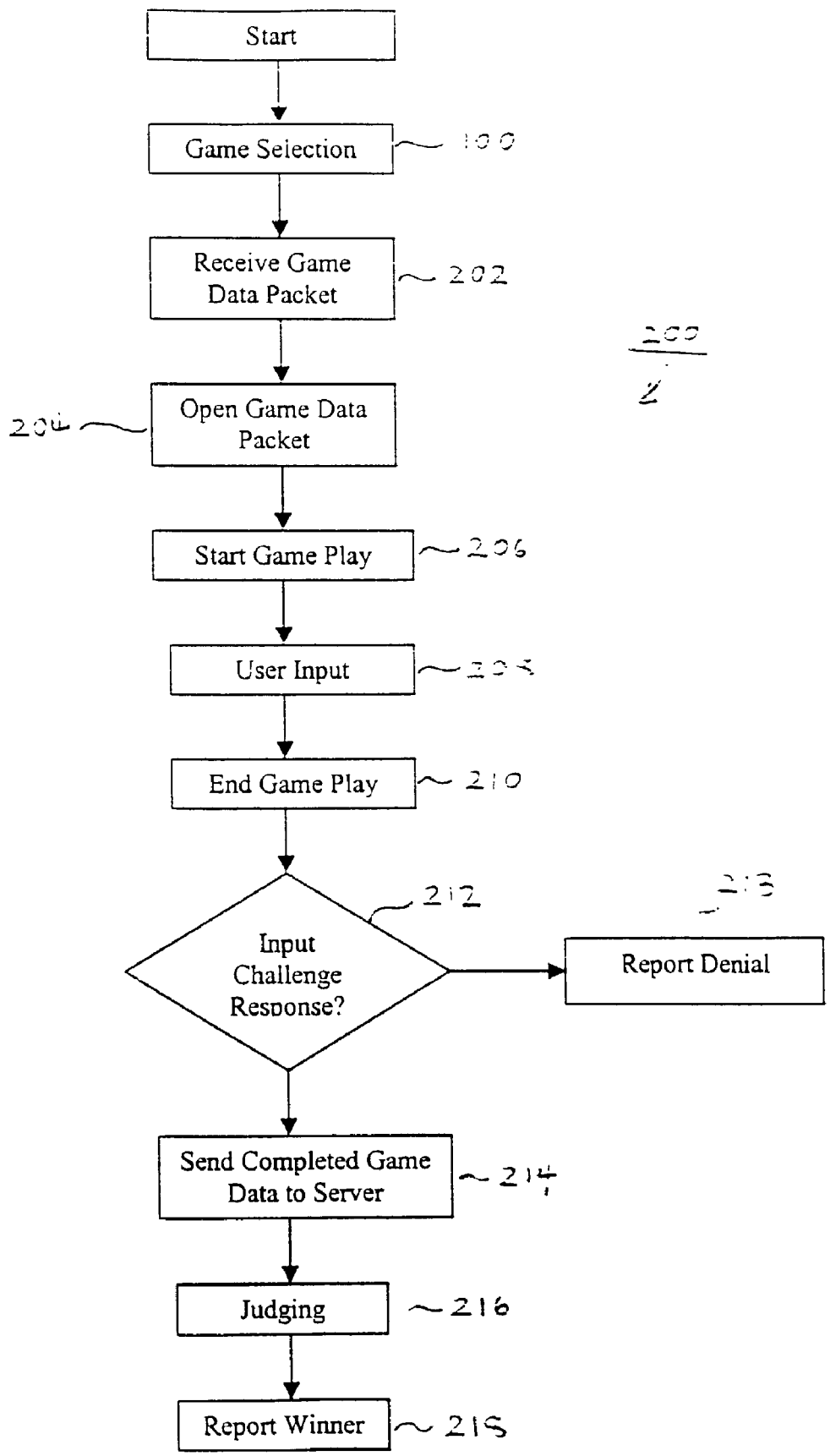
FIG. 6 is a functional block diagram detailing the method for establishing game play in the computer system of FIG. 1.
Figure 7:
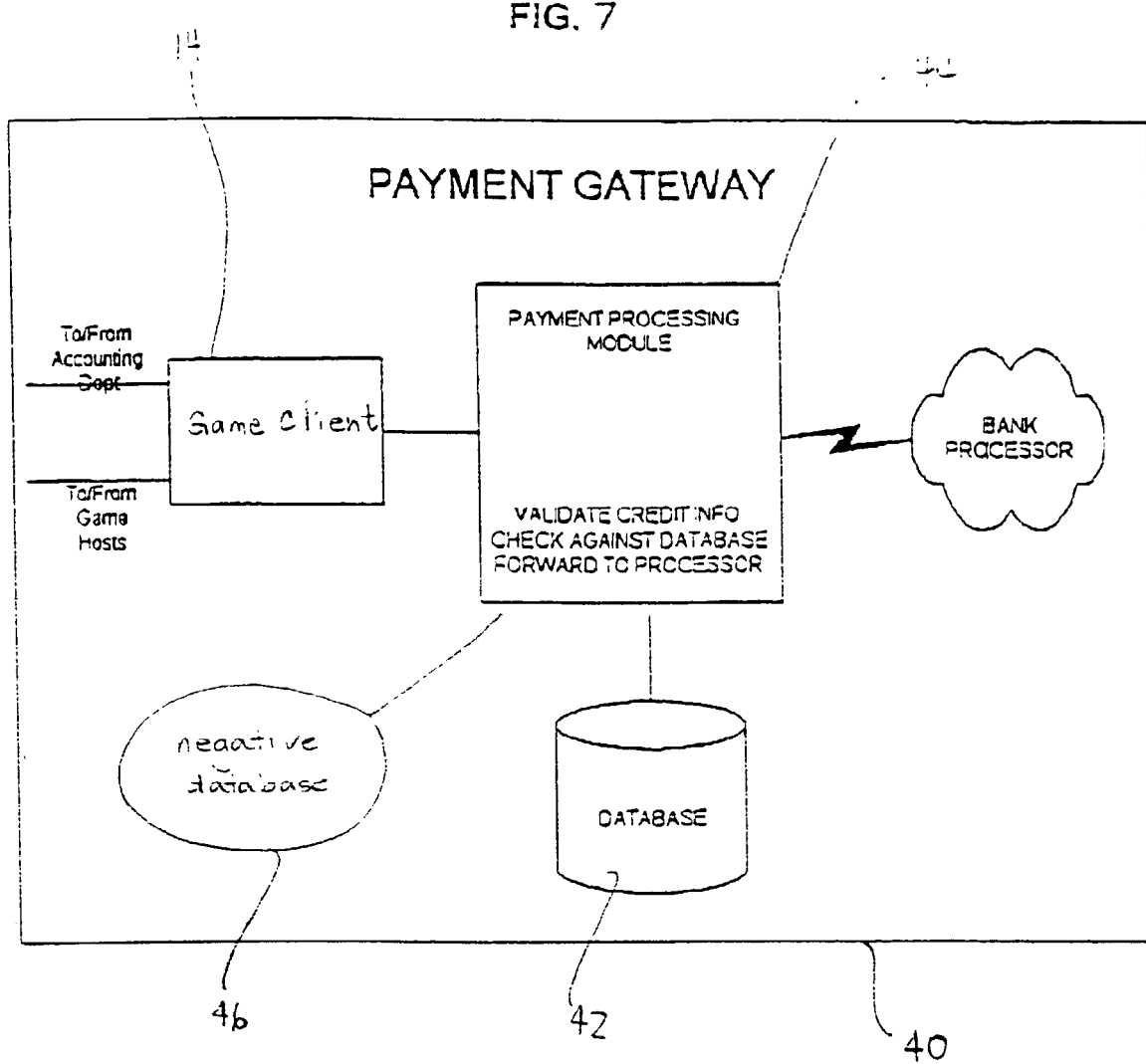
FIG. 7 is a schematic diagram of the payment gateway in the computer system of FIG. 1.

The method of establishing secure communication between a server 12 and game client 14 is detailed in FIG. 5. This method is applicable to communication by game client 14 with any one of a master server 12, a game server 15 or a management server 17 as shown in FIG. 4. On sending data from a game client 14, the client application 16 instructs the library 17, through the API to form a connection with the server. On receipt of the instruction, the API forms the connection with the server, as indicated at 102. In the preferred embodiment game client 14 uses a secure TCP/IP or UDP protocol to communicate with the server. On forming a connection, the game client 14 will retrieve a list of games and/or tournaments for the purposes of game selection, 104. The server (or game host) compares the skill level of the game client and the skill level associated with the game selected, 106. If the skill level of the game client is equivalent to or less than that of the skill level of the game selected, the game selection will be approved. In the alternative, if the skill level of the game client exceeds the skill level of the game selected, the server either approves the selection and applies a handicap, 109, or reports denial of the game selection to the game client, 108, and returns the game client to the game selection process 104. On returning to the game selection, the game client may then select a game of the appropriate skill level. Alternatively, the game client may select to end the game selection. Once the game selection is approved, the server then authenticates the validity of the payment credentials of the game client, 110 and return data stating the success 111, or a failure 112 of the validation. On completion of the authorization phase, 110, the game client is ready to begin the game 114. Game plays is further detailed in FIG. 6.

After completing game selection, 100, the game client receives a game data packet from the server, 202. The game client will open the game data packet 204 at which time the information contained therein is displayed to the game client and the game commences 206. The client application of the game client displays the symbols to the game client. The game client inputs data to the game board in response to the symbols as revealed, 208. The client application continues to display game symbols until the game client signals the end of the game play, 210, on completion of the required game board pattern(s). At the completion of game play, the client application 16 records the completion time of the game and appends it to the game data packet. The game client is then prompted with a challenge question to which a response is input, 212. The client application evaluates the challenge response. On entry of an incorrect response, the error is reported to the game client and the game terminates. Entry of a correct response signifies the completion of game play and the game data packet is sent to the server 214. On receiving the game data packets, the server evaluates the results sent from each game client and judges the outcome of a particular game 216, primarily on the basis of the time elapsed between game commencement and game completion as previously described. The server will then notify each game client of the game outcomes, 218.

In the preferred embodiment, the system further includes a payment gateway 40 as shown in FIG. 4. The payment gateway 40 is further illustrated schematically in FIG. 7. The payment gateway 40 receives digital data from a game client 14 and verifies that data against an existing database 42 of credit information. The payment gateway 40 is further responsible for sending digital data to the game client containing the results of the credit verification. The payment gateway 40 further includes a payment processing model 44 which validates credit information received from the game clients 14 and compares this credit information against a negative credit database 46. The results of this credit comparison are preferably sent to the master server 12 for processing through an accounting system (not shown).

Figure 9:
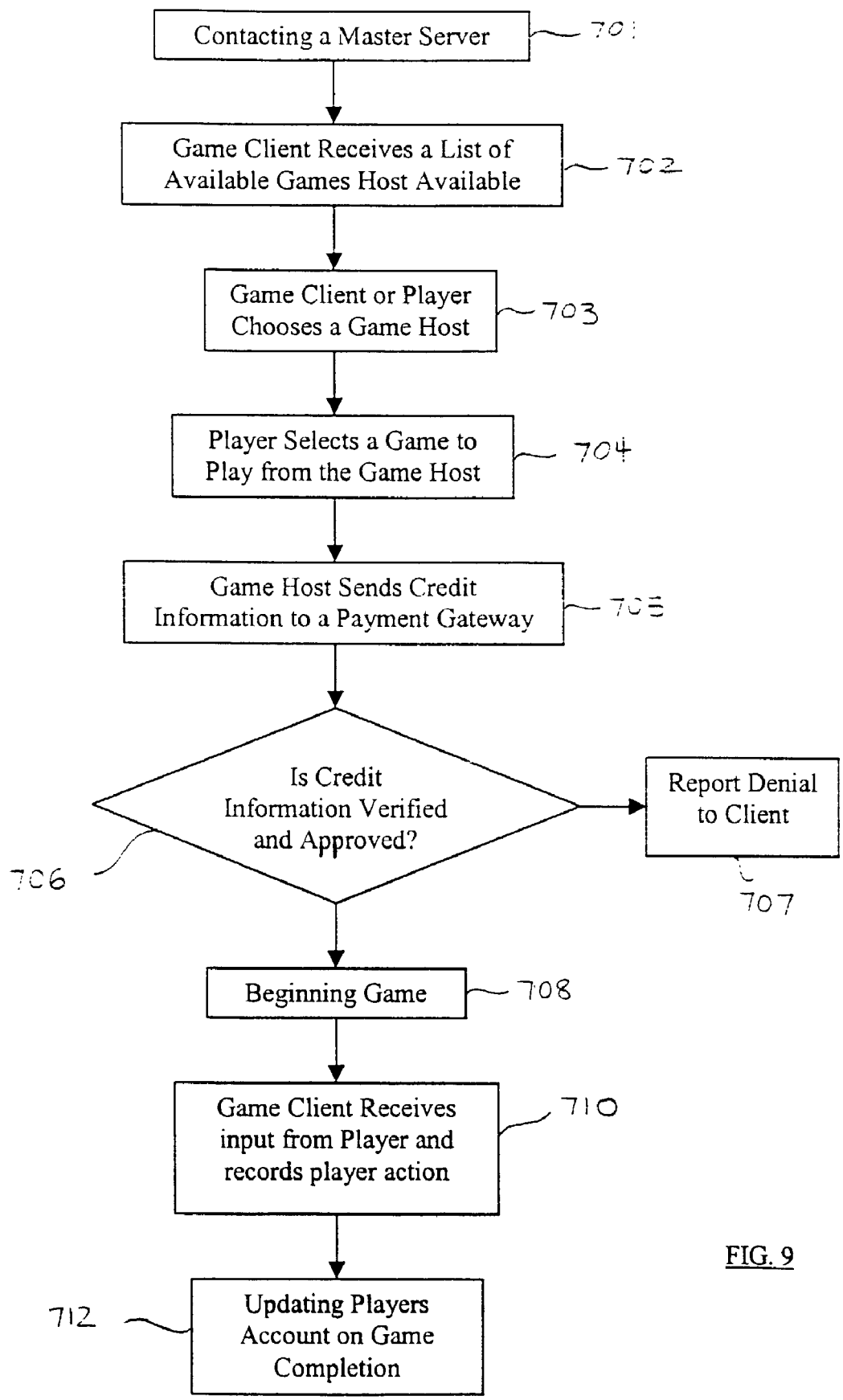
FIG. 9 is a functional block diagram detailing the method of game payment according to the computer system of FIG. 3.

The overall functioning of the payment gateway 46 is detailed in FIG. 9. A player initiates a session through use of a game client 14 such that, that player may play a skilled game. The game client 14 communicates with a master server 701 and receives a list of game servers that are currently available. In the preferred embodiment this server list is sorted by at least one of bandwidth and network latency so as to allow a game client to select a game server which is closest to the location of that game client 703. Alternatively, the game server closest to the game clients location may be selected automatically. In addition, in alternate embodiments, the game client may communicate with game servers without interacting with the master server. Such may be the case where a game client has set up preferences or is resuming previous game play. A game client may interact with various game servers in order to peruse the games listed at those particular game servers and select a game to play 704. Once a game is selected, the credit information is sent to a payment gateway via the server or game host controlling the game 705. The system operates with existing authorizing financial institutions and credit processing services over a secure network. Once the credit information has been verified and approved 706, the game host will begin the game 708 and send game data packets to the respective game clients. The player input is recorded by the game client 710. On completion of the game, information is sent to the game host and, in turn, to the payment gateway in order to update account balances of the game clients 712. In the preferred embodiment, statistical information on the game is further sent to a statistics monitor (not shown). If the credit information is not verified or approved prior to game play, this denial is reported back to the game clients 707 and the play of the game is not permitted.

The game play by the game client 14 involves the matching of a plurality of symbols revealed to the player to symbols found on a game board such that a specific shape or pattern is formed on the game board by marking of the symbols. Game play may involve one or more game boards. Further, symbols may be in the form of numbers, letters, crosswords, pictures, trivia questions, and the like. On opening a game data packet, the game boards contained therein are displayed to the game client. The number of game boards contained within the data packet may be selected by the user based on the game selection, or in the alternative, is associated with the level of skill required for a particular game. For example, ten game boards may be associated with an advanced skill level. On commencing game play, the symbols generated by the random number generator of the game host are forwarded to the game client 14 in the game data packet. The symbols are then revealed to game client 14 either one by one or may be displayed at one time in a chart form or the like. The mode of symbol revelation is preferably determined by the game host.

In the case where the symbols revealed are trivia questions, the player must first answer the question revealed and then locate the symbol representative of the answer to this question on the game board.

In the case where the symbols are revealed one at a time, the speed of revelation, in the preferred embodiment, may be selected by the player or may be pre-set by the game host, such that the data pertaining to the speed of revelation is contained within the game data packet. The player, on revelation of the symbols, marks the matching symbol, if any, on the respective game board(s). The client application 16 of the game client 14 continues to reveal these symbols until the player indicates that the desired result has been achieved and indicates to the client application, the completion of the game.

On completing the game, the time elapsed between the start and finish is recorded by the client application 16. In addition, the game client 14 tracks the recordal of each symbol marked on the game board and preferably records both the time of marking (in relation to the start of game play) and the order of the marking. This data along with the elapsed time is appended to the game data packet and sent to the server for judging. Game play involves the use of plurality of skills which are used to predominate the play of the game and allow for an experienced player to predictably win over an inexperienced player. Such skills include hand eye co-ordination, reaction time, dexterity, spatial memory, long term memory, pattern recognition, organizational skills, strategic planning, and game play knowledge.

In order to facilitate an equal playing ground for both skilled and unskilled players, the system further introduces a ranking or handicapping system. This ranking system is such that as player skill improves, the difficulty of play increases. In order to allow for ongoing fair competition, the system must account for skill development. For example, each player is assigned a particular skill level. On log on of that player through a game client 14 to a game server, the system retrieves the associate skill level of that player. Skill level may be determined on the basis of the number of game boards that are played, the speed at which the symbols are revealed to the player, the type of game board patterns and combinations of patterns required, a shuffling of game board location and the like. In a skilled game, while winning is a strong motivator, game play competition is heightened by ranking and peer recognition of successful game play.

On game play, each player receives a number of identical game boards. Each player receives the same number of game boards unless a handicap has been applied to a skilled player, and the skilled player plays a greater number of game boards. Each player receives an identical game data packet and is revealed the identical symbols. The symbols are revealed at an identical rate, again unless a handicap has been applied to a skilled player and the symbol revelation speed is increased. A player must quickly navigate the series of game boards displayed to identify and mark each of the symbols revealed on each of the respective game boards. As all players play identical game boards it becomes a timed competition based on which player can keep up with the symbols revealed, navigate their respective game boards, mark the respective symbols, identify winning combinations and indicate game completion. Each player has an equivalent potential of winning the game played. Any method of timing known to one skilled in the art may be used such that the time is recorded between the start and completion of game play. The time of each player to complete the identical game is calculated. In order to win, a player must demonstrate the successful marking of all symbols revealed on all game boards played leading up to game completion. Both speed and accuracy factor into judgement of game winning as is previously described. However, game winning may further include answering of skill testing questions, trivia questions, crosswords or product recognition.

Although the invention has been described with reference to certain specific embodiments, various modifications thereof will be apparent to those skilled in the art without departing from the spirit and scope of the invention as outlined in the claims appended hereto.

The invention claimed is:

1. A method for hosting a game for participants located at a plurality of game clients to enable said game to be played based on skill and give said participants an equal chance of winning wherein play of said game normally includes an element of chance, said method comprising:
    transmitting a game data packet corresponding to said game to each of said plurality of game clients;
    initiating said game;
    transmitting a predetermined number of identical game messages at predetermined time intervals and in sequence to each of said plurality of game clients at the same time during play of said game, said game messages representing steps in said game and being presented to each of said plurality of game clients at the same time to give each of said participants an equal chance of winning by utilizing skill to play said game;
    sensing end of said game;
    receiving end of game data packets from each of said plurality of game clients indicating the results of said game based on how said identical game messages are played; and
    evaluating said end of game data packets to determine a post-game skill level of each of said participants located at said plurality of game clients.

2. The method of claim 1 further comprising, before said step of transmitting a game data packet, the steps of:
    sensing a game data packet request from each of said plurality of game clients;
    determining pre-game skill level of each of said plurality of game clients; and
    selecting said game data packet for each game client based on said pre-game skill level of each game client.

3. The method of claim 2 wherein said step of determining pre-game skill level of each of said plurality of game clients comprises the steps of:
    retrieving game client's current skill level; and
    comparing said current skill level with a game skill level.

4. The method of claim 1 further comprising, after said step of sensing said end of game, the steps of:
    transmitting a challenge to said game client which transmitted said end of game message;
    receiving a response to said challenge from said game client; and
    validating said game if said response is correct.

5. The method of claim 4 further comprising, after the step of evaluating said end of game data packets, the step of:
    determining a winner of said game based on said post-game skill level when said game is validated.

6. The method of claim 1 further comprising the step of transmitting said post-game skill level to each of said plurality of game clients.

7. The method of claim 1 wherein said step of initiating said game comprises the step of:
    sensing execution of said game module by each of said plurality of game clients to commence said game.

8. The method of claim 1 wherein said step of sensing said end of said game comprises the step of:
    sensing an end of game message from one of said plurality of game clients.

9. The method of claim 1 further comprising, before the step of initiating said game, the step of:
    receiving payment for playing said game from each of said participants.

10. A method of providing a game in a multi-participant environment to enable said game to be played based on skill and give multiple participants an equal chance of winning wherein play of said game normally includes an element of chance, said method comprising the steps of:
    sensing requests from each participant for a game data packet corresponding to said game;
    transmitting an identical game data packet to each of said participants to enable each of said participants to utilize skill to compete in said game wherein each of said game data packets are updated according to moves executed by each of said participants during game play in response to a sequence of identical game messages transmitted to each of said participants at the same time, said game messages related to individual steps required to play said game and thereby producing updated game data packets;
    receiving an end of game message from one of said participants;
    receiving said updated game data packets from each of said participants corresponding to said completed game;
    evaluating each of said updated game modules to determine skill level of each of said participants.

11. A method of playing of a game based on skill and wherein play of said game normally includes an element of chance comprising the steps of:
    a participant receiving a game data packet from a server, said data packet being identical to other game data packets provided to other participants;
    said participant executing said game data packet to commence playing said game based on skill to give said participant an equal chance of winning against said other participants;
    said participant updating said game data packet during game play corresponding to moves executed by said participant in response to a sequence of game messages transmitted to said participant at the same time as being sent to said other participants, said moves being related to individual steps required to play said game and thereby produce an updated game data packet;
    said participant signaling completion of said game to said server; and said participant transmitting said updated game data packet to said server for evaluation a skill level of said participant based on the play of said other participants.

12. A method according to claim 10 further comprising the step of communicating said skill level to each participant.

13. A method according to claim 10 wherein the length of said selected game is timed, including recording the time taken to respond to each of said game messages and wherein details regarding said time taken is included in said updated game packets for evaluating said skill.

14. A method according to claim 11, wherein the length of said selected game is timed, including recording the time taken to respond to each of said game messages and wherein details regarding said time taken is included in said updated game packet for evaluating said skill.

* * * * *